United States Patent [19]

Paielli et al.

[11] Patent Number: 6,131,552
[45] Date of Patent: Oct. 17, 2000

[54] FUEL CONTROL SYSTEM FOR A GAS-OPERATED ENGINE

[75] Inventors: Perry M. Paielli, Brighton; Dean A. Pennala, Farmington Hills, both of Mich.

[73] Assignee: Dana Corporation, Toledo, Ohio

[21] Appl. No.: 09/309,056

[22] Filed: May 10, 1999

Related U.S. Application Data

[63] Continuation-in-part of application No. 09/134,114, Aug. 14, 1998.

[51] Int. Cl.⁷ .................................................. F02B 43/00
[52] U.S. Cl. ........................ 123/527; 123/525; 123/27 GE
[58] Field of Search ....................................... 123/525, 527, 123/526, 27 GE; 137/82; 251/129.17, 331

[56] References Cited

U.S. PATENT DOCUMENTS

| | | |
|---|---|---|
| 3,441,246 | 4/1969 | Lauppe et al. . |
| 3,446,471 | 5/1969 | Westphal . |
| 4,020,810 | 5/1977 | Baverstock . |
| 4,141,326 | 2/1979 | Wolber . |
| 4,364,364 | 12/1982 | Subramaniam . |
| 4,369,751 | 1/1983 | Batchelor et al. ...................... 123/672 |
| 4,413,607 | 11/1983 | Batchelor et al. . |
| 4,449,509 | 5/1984 | Young . |
| 4,505,249 | 3/1985 | Young . |
| 4,541,397 | 9/1985 | Young . |
| 4,574,763 | 3/1986 | Hallberg .................................. 123/527 |
| 4,597,364 | 7/1986 | Young ............................... 123/27 GE |
| 4,606,322 | 8/1986 | Reid et al. . |
| 4,632,083 | 12/1986 | Reggiani . |
| 4,662,604 | 5/1987 | Cook . |
| 5,101,799 | 4/1992 | Davis et al. ............................. 123/527 |
| 5,105,791 | 4/1992 | Nye, Jr. . |
| 5,117,798 | 6/1992 | Nozaki . |
| 5,146,903 | 9/1992 | Baverstock ............................. 123/527 |
| 5,150,685 | 9/1992 | Porter et al. . |
| 5,150,690 | 9/1992 | Carter et al. . |
| 5,183,011 | 2/1993 | Fujii et al. . |
| 5,343,847 | 9/1994 | Chasteen et al. . |
| 5,367,999 | 11/1994 | King et al. . |
| 5,445,134 | 8/1995 | Barbanti . |
| 5,584,467 | 12/1996 | Harnett et al. . |

FOREIGN PATENT DOCUMENTS

| | | |
|---|---|---|
| 0 064 373 | 11/1982 | European Pat. Off. . |
| 690215 A2 | 1/1996 | European Pat. Off. . |
| 711913 A1 | 5/1996 | European Pat. Off. . |
| WO 95/04213 A1 | 2/1995 | WIPO . |

*Primary Examiner*—Henry C. Yuen
*Assistant Examiner*—Hai Huynh
*Attorney, Agent, or Firm*—Reising, Ethington, Barnes, Kisselle, Learman & McCulloch, PC

[57] ABSTRACT

A fuel control system for delivering gaseous fuel from a source through an air/fuel mixture to a gas-operated engine that includes at least one sensor for operative coupling to the engine to provide at least one electronic sensor signal responsive to engine operating conditions. An electronic control unit is responsive to the sensor signal(s) for providing a fuel control signal indicative of a desired quantity of fuel to be delivered to the engine. A pressure regulator, for disposition between the fuel source and the fuel/air mixture, is responsive to the fuel control signal for controlling delivery of gaseous fuel to the mixer. The pressure regulator includes a housing having an inlet for connection to the fuel source and an outlet for connection to the mixer. A valve is disposed within the housing and biased toward closure by a primary pressure regulating spring for controlling flow of fuel from the inlet to the outlet. A solenoid force motor is mounted on the housing and has a force coil for receiving and translating the fuel control signal. A rigid actuating member is driven by and extends from the coil into the housing directly to the valve-actuating lever for modulating control of the operative position of the valve in bypass mechanical force transmission relationship to the regulating spring, and thereby modulating control flow of gaseous fuel through the housing, as a function of the fuel control signal to the pressure regulator.

15 Claims, 3 Drawing Sheets

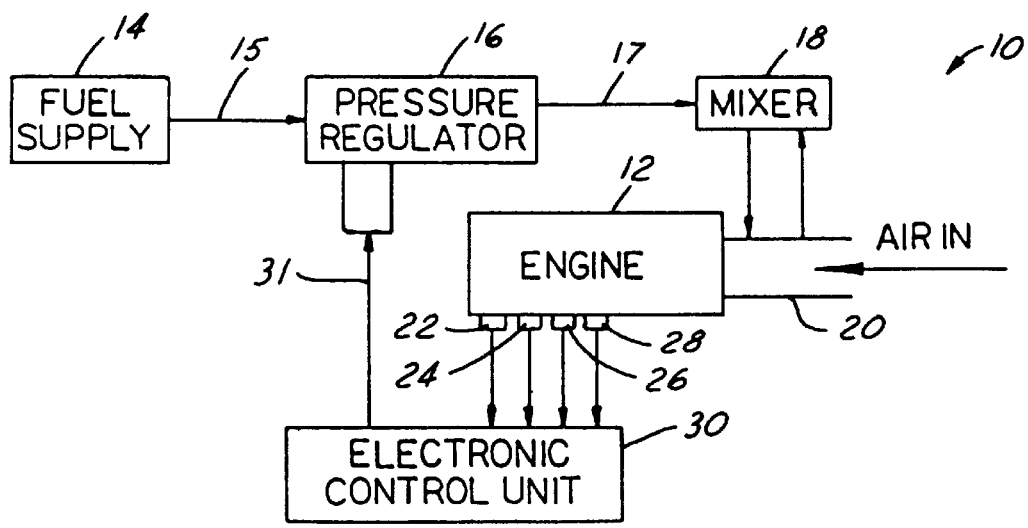
FIG. 1
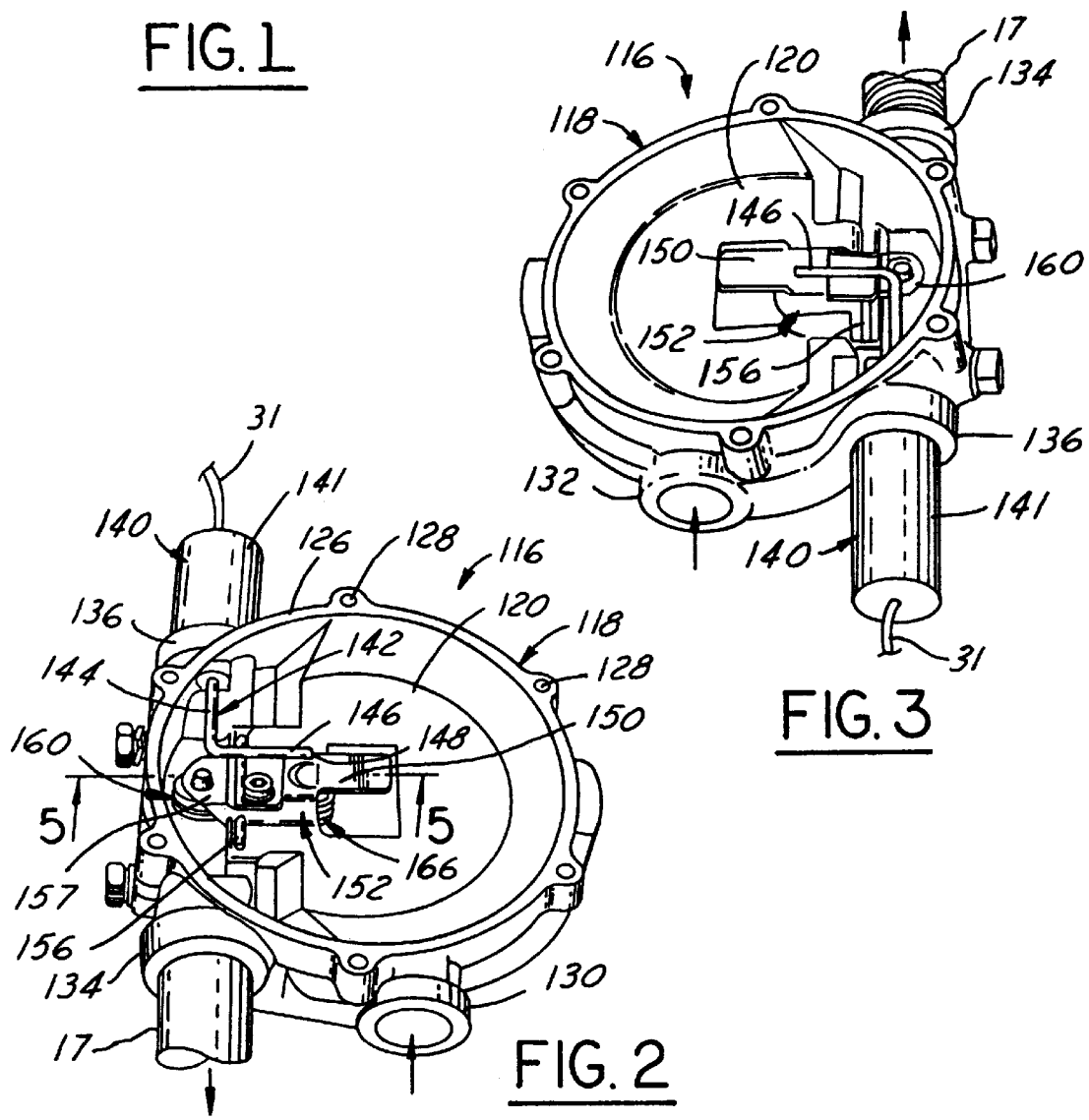
FIG. 2
FIG. 3

FUEL CONTROL SYSTEM FOR A GAS-OPERATED ENGINE

This application is a continuation-in-part of U.S. application Ser. No. 09/134,114 filed Aug. 14, 1998 and claims the benefit thereof under 35 U.S.C. §120.

FIELD OF THE INVENTION

The present invention is directed to gas-operated internal combustion engines, such as liquid petroleum (LP) and natural gas engines, and more particularly to fuel control systems for delivering gaseous fuel from a source serially through a pressure regulator and an air/fuel mixer to such gas-operated engines.

BACKGROUND OF THE INVENTION

In conventional gas-operated engines, gaseous fuel, such as LP fuel or natural gas, is fed through a pressure regulator to an air/fuel mixer or carburetor. The pressure regulator includes a spring-biased diaphragm that is operated by engine intake air pressure, and that, in cooperation with a pressure regulating flow control valve, functions to feed gas at constant pressure to the mixer. The mixer functions to mix the gaseous fuel with air, and to feed the mixture to the engine intake manifold for transmission to the cylinder intake ports. In engine fuel control systems of this type, it is difficult to obtain optimum fuel flow over a wide range of operating conditions due to the design, calibration and maintenance requirements of the various mechanical components. Furthermore, fuel pressure does not achieve the necessary level to allow control by fuel injection and other conventional techniques employed in conjunction with gasoline engines.

Accordingly, several prior art fuel control systems have been proposed to provide a system for electronically controlling fuel flow to the mixer of a gas-operated engine so that engine operation can be electronically controlled by a microprocessor-based ECU or the like responsive to various engine and other parameter signals, and thereby achieve optimum fuel flow over a wide range of operating conditions. Examples of such prior art systems are disclosed in U.S. Pat. Nos. 4,449,509 and 5,117,798. which are incorporated by reference. These prior systems provide a solenoid motor having a linear actuator that is coupled through the housing of the pressure regulator to the main biasing spring for the regulator valve structure to thereby supplement the manifold vacuum sensing regulator diaphragm of the regulator by further varying the biasing force exerted by the valve-biasing spring. In this way, the primary spring-controlled operation of the regulator can be control modulated electronically, either entirely or supplemental to engine manifold pressure fluid/mechanical modulation.

More particularly, these prior art fuel control systems for delivering gaseous fuel from a high pressure source serially through a diaphragm-type pressure regulator and an air/fuel mixer to a gas-operated engine include at least one sensor for operative coupling to the engine to provide at least one electronic sensor signal responsive to a selected engine operating parameter or condition. An electronic control unit is responsive to the sensor signal(s) for providing a fuel control signal indicative of a desired quantity of fuel to be delivered to the engine in accordance with the sensed condition. A pressure regulator, for disposition between the fuel source and the fuel/air mixture, is responsive to the primary regulating valve spring, manifold vacuum and the fuel control signal for controlling delivery pressure of gaseous fuel to the mixer. The pressure regulator includes a housing having an inlet for connection to the fuel source and an outlet for connection to the mixer. A regulating valve is disposed within the housing and is spring-biased toward closure for controlling pressure and flow of fuel from the inlet to the outlet. A linear-actuator type solenoid force motor is built into the housing or located remote therefrom, and has a linear actuating coil for receiving the fuel control signal, and a linear-motion armature rod or piston that extends from the force coil into the housing to abut or engage one end of the valve biasing compression coil spring. The axially opposite end of the spring engages the valve-remote arm of a pivoted (first-class type) lever carrying the regulating valve at the end of its other arm. The armature rod operates to bodily move and/or vary the stress level of the spring for modulating control of the operative position of the valve via the valve biasing spring, and thereby is intended to control flow of gaseous fuel through the housing, as a function of the fuel control signal to the pressure regulator.

One disadvantage of the aforementioned fuel control systems of the foregoing prior art patents is that they mechanically input to the control system the effect of the at least one electronic sensor signal by applying the electromagnetically generated linear actuating force via a "soft" link, namely, the resilient valve biasing spring in the foregoing manner. Hence their mode of operation is to vary the urging force of the spring in order to achieve the cumulative spring and linear actuating coil biasing force tending to close the pressure regulating valve of the pressure regulator. On the other hand, manifold vacuum sensing by the pressure regulating diaphragm is rigid coupled by direct mechanical engagement with the valve-remote end of the valve operating lever. Hence a fluid-pressure differential-generated force exerted by the diaphragm is transmitted directly to the lever and via the lever only to the regulating valve member. Since the valve operating lever is essentially a rigid mechanical force transmitting member, it does not introduce an additional spring force or rate variable parameter into the system for controlling the pressure regulating valve operating forces.

However, the transmission of electromagnetically generated linear actuating force through the resilient valve biasing spring (that provides the main pressure regulating component of the pressure regulator) thus introduces the aforementioned "soft" element into the force transmitting linkage from the force coil linear armature rod, or piston, thereby adding another parameter and design complication to the system.

In addition to this "soft link" disadvantage, the systems of the two aforementioned prior art patents, due to the use of the valve biasing spring as a force transmitting element for inputting the additional electronic sensor signal input, do not lend themselves to retrofit modification of existing engine installations of fuel control system diaphragm-type, i.e., those pressure regulators in which the primary regulating spring action is modulated by changes in manifold vacuum sensed by the regulator diaphragm that acts directly on one end of a first class lever that moves the pressure regulating valve against the bias of a valve biasing spring acting between the valve lever and the regulator housing. Rather, the fuel control systems of the aforementioned prior art patents require that some or all of the components of the electronic control unit be incorporated by original design of the unit into the regulator structure and thus provided by incorporation at the point of the original manufacture of the regulator, thereby inherently rendering such fuel control systems unfit and/or uneconomic for application by retrofit to existing diaphragm-type pressure regulating housings.

OBJECTS OF THE INVENTION

Accordingly, it is an object of the present invention to provide an improved system, method and apparatus for electronically controlling fuel flow to the mixer of a gas-operated engine so the engine operation can be electronically controlled by microprocessor-based ECU or the like responsive to various engine and other parameter signals wherein the electronic sensor signal is electromagnetically converted to a mechanical actuating force that is directly mechanically coupled to the pressure regulator valve in a manner that eliminates the undesirable variable of a spring function parameter in the force application valve modulation system responding to the electronic sensor signal.

Another object is to provide an improved system, method and apparatus of the foregoing character which is simple, economical and reliable in construction and that may be readily added by way of retrofit mounting to existing diaphragm-type gas fuel pressure regulators already present in existing fuel control systems vehicle installations for delivering gaseous fuel from a source through an air/fuel mixture to a gas operated engine.

SUMMARY OF THE INVENTION

In general, and by way of summary description and not by way of limitation, the present invention accomplishes the foregoing as well as other objects by providing a fuel control system generally of the type described above in which the solenoid force motor actuates a rigid actuating member that extends from the coil into the housing, but is mechanically operably coupled to the pressure regulating valve member independently of the main biasing spring that acts on the valve actuating lever. Hence the solenoid force motor modulates the force applied by the main biasing spring to the valve member in mechanical bypass relation to the structure of such spring while functioning to modulate the control of the operative position of the pressure regulating valve member, and therefore flow fuel through the housing, as a function of the fuel control signal to the pressure regulator. Preferably the actuating member abuttingly engages but is not pull-connected to the lever so that the actuator member can push against the lever but cannot pull on the lever. In a preferred arrangement the valve actuating lever is pivotally supported within the housing on a fulcrum pivot disposed between the valve member and the spring, the valve member and lever are both disposed on the same side of the diaphragm, and the rigid actuating member of the solenoid force motor is disposed to operatively engage the lever between the lever and the diaphragm and on the side of the lever opposite from that facing the spring.

For retrofit applications to pre-existing "universal port" type diaphragm pressure regulators, a rotary-type solenoid force motor is encased in a housing that can screw into one of the unused outlet port bosses in place of the normal pipe-plug therein. Hence the force motor casing functions as both a plug for the unused port and as a mount for the solenoid force motor. The actuating member extends from a rotary solenoid within the casing co-axially therewith and is configured as a cantilever rod with a right-angle finger that overlies the actuating lever between the lever and diaphragm and abuttingly swings into engagement with the lever in response to rotation of the armature of the solenoid.

In another embodiment the solenoid force motor is mounted in a casing fastened to the regulator housing and has the actuating member configured as a straight rod that serves as a pivot journal for mounting the valve actuating lever thereon and is coupled thereto in push-pull torque transmission relationship.

In still another embodiment the solenoid force motor is mounted on a wall of the housing that is vented to atmosphere and thus extends into an atmospherically vented chamber. The force motor includes a linearly actuated armature rod piston or pintle that operatively engages the diaphragm on the side thereof remote from the valve actuating lever. Hence there are no atmosphere sealing requirements for mounting of the solenoid force motor and its associated actuating member. Preferably the actuating member is aligned with the mechanical coupling point between the diaphragm and one end of the valve actuating lever in order to provide a rigid mechanical coupling therebetween, and one that is arranged in bypass relation to the main pressure regulating spring that engages the valve actuating lever and biases the valve member toward closed position.

BRIEF DESCRIPTION OF THE DRAWINGS

The invention, together with additional objects, features and advantages thereof, will be best understood from the following detailed description, the appended claims and the accompanying drawings in which:

FIG. 1 is a functional block diagram of a gas-operated engine fuel delivery system incorporating a diaphragm-type pressure regulator modified in accordance with presently preferred embodiments of the invention;

FIG. 2 is a fragmentary perspective view of a first embodiment of a pressure regulator of the system of FIG. 1 with both the regulator diaphragm and diaphragm cover or lid removed therefrom, and thus not shown, to better illustrate a solenoid force motor and associated rigid actuating member mounted to the housing in accordance with the present invention.

FIG. 3 is a fragmentary perspective view of the pressure regulator of FIG. 2 viewed from the complementary refractive perspective viewing angle.

DETAILED DESCRIPTION OF PREFERRED EMBODIMENTS

Figure 4:
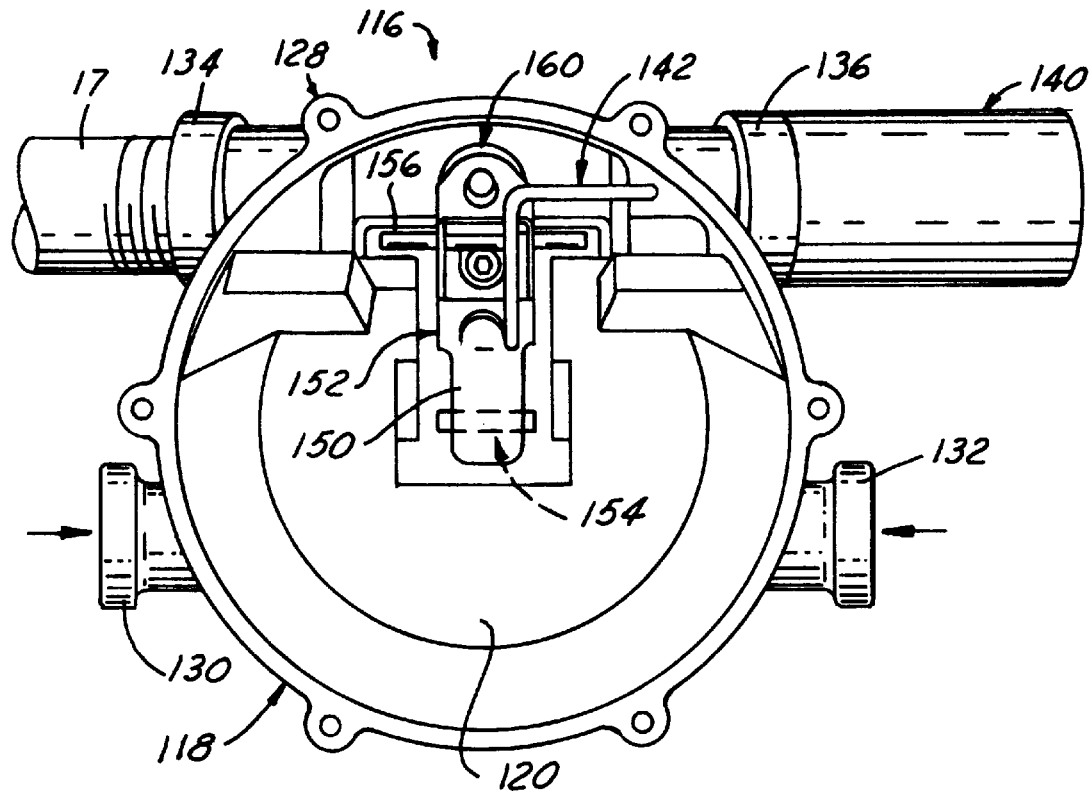
FIG. 4 is a fragmentary plan view of the unit shown in FIGS. 2 and 3 and also illustrating diagrammatically a notched bracket that is carried by the regulating diaphragm and slides over the valve-remote end of the valve operating lever.

FIG. 1 illustrates a fuel delivery system 10 in accordance with a presently preferred embodiment of the invention as comprising an engine 12 of a type adapted to be operated by gaseous fuel such as liquid petroleum (LP) or natural gas. A fuel supply 14 is connected via a supply line 15 to a pressure regulator 16 and thence via supply line 17 to a mixer of carburetor 18, which functions to mix gaseous fuel supplied by regulator 16 with air, and to deliver the fuel/air mixture to an engine air intake manifold 20. Mixer 18 preferably is responsive to engine inlet air pressure for controlling delivery of the air/fuel mixture to the intake manifold. At least one sensor, preferably a plurality of sensors 22, 24, 26, 28, are operatively coupled to engine 12 for providing electronic sensor signals as a function of associated engine operating parameters or conditions. For example, sensors 22–28 may be responsive to engine speed, engine temperature, manifold air pressure, air temperature or exhaust oxygen content for feeding corresponding sensor signals to an engine control unit (ECU) 30. ECU 30 is responsive to the signals from the several sensors 22–28 for determining quantity of fuel needed for operation at the engine. Needed fuel quantity may be determined by any suitable technique, preferably by reference to engine fuel delivery tables or maps as a function of the sensor input signals. A presently preferred technique for so determining the fuel quantity needed at the engine, and supplying a corresponding fuel control signal, is disclosed in U.S. Pat. No. 5,091,858, assigned to the assignee hereof and incorporated herein by reference. A modified technique, employing analog neural network technology, is disclosed in U.S. application Ser. No. 08/920,808, filed Aug. 29, 1997, now U.S. Pat. No. 5,806,013 also assigned to the assignee hereof and also incorporated herein by reference. Alternatively, the sensor input signals may be employed within electronic control unit 30 for periodically mathematically calculating desired fuel quantity, and providing via lead 31 a corresponding fuel control signal to a force coil mounted on pressure regulator 16.

FIRST EMBODIMENT PRESSURE REGULATOR

Figure 5:
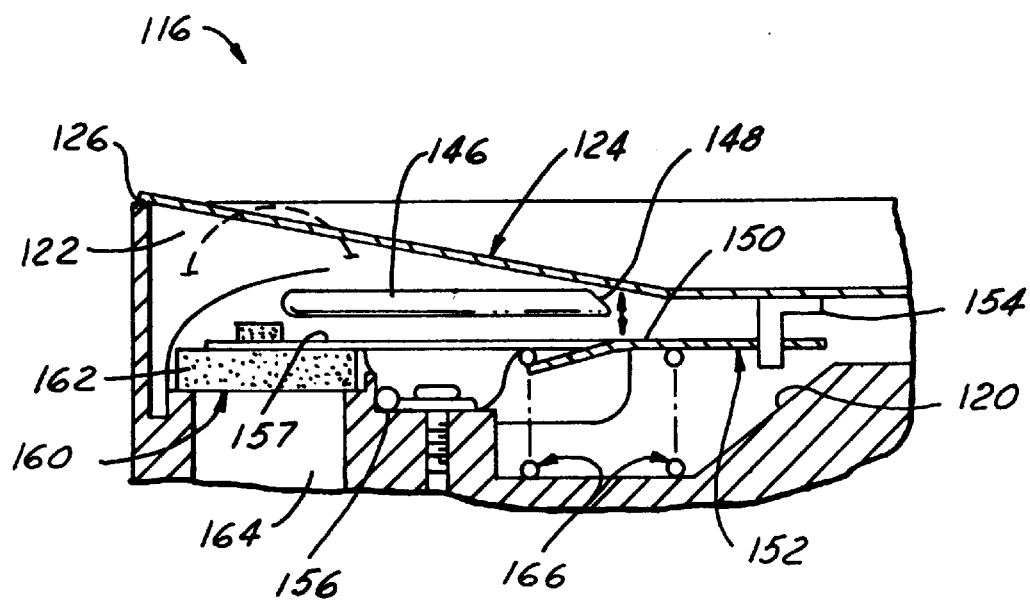
FIG. 5 is a fragmentary cross-sectional view taken on the line 5—5 of FIG. 2 and illustrating additionally the regulating diaphragm and associated valve coupling bracket as provided with a pre-existing commercially available pressure regulator mechanism to which the retrofit fuel control components of the invention are added.

FIGS. 2, 3, 4 and 5 illustrate a first embodiment pressure regulator 116 that may be installed in the system of FIG. 1 for use as pressure regulator 16. Regulator 116 illustrates a retrofit installation in accordance with one principal feature of the present invention wherein a conventional, commercially available diaphragm-type pressure regulator of the "universal port" type is economically and reliably modified to incorporate a solenoid force motor responsive to signals from ECU 30 to modulate the force applied by the regulating spring to the pressure regulating valve member of the regulator. More particularly, regulator 116 may, for example, be that manufactured and sold by IMPCO Company under Model No. BI-I5868, 97 Series, type 7A. As so manufactured and sold for use as a standard manifold vacuum modulated, diaphragm-type pressure regulator, this unit includes a cast metal circular housing body 118 having a mid-plane wall 120 that subdivides the housing 118 into two laterally adjacent gas chambers, namely, a high pressure chamber (not shown) disposed beneath wall 120 to which high pressure gaseous fuel is admitted via line 15 from fuel supply 14, and a low pressure chamber 122 (FIG. 5) defined between mid-plane wall 120 and a flexible regulating diaphragm 124 (FIG. 5). Diaphragm 124 is configured to have its periphery fit against an annular planar mounting surface 126 and is sealably clamped thereagainst by a dome shaped cover lid (not shown). The cover lid is removably fastened by mounting studs threaded into six mounting holes 128 to thereby sealably sandwich the periphery of diaphragm 124 between housing mounting surface 126 and the juxtaposed mounting surface of the lid.

Regulator 116 is of the "universal coupling" type and therefore is provided with port and starboard alternate inlet bosses 130 and 132 coaxially aligned with one another on opposite sides of housing 118 and individually communicating with the high pressure chamber of the housing. Likewise, regulator 116 is provided with port and starboard alternate outlet bosses 134 and 136 coaxially aligned with one another and each communicating with the low pressure chamber 122. By having such alternative port and starboard dual inlet and outlet bosses, regulator 116 has enhanced supply line hook-up versatility to best match the various supply line layout requirements for "under-the-hood" mounting in the engine compartment of various vehicles. Thus, the feedline 15 for coupling fuel supply 14 to pressure regulator 16 can be pipe-thread screwed into either the port inlet boss 130 or the starboard inlet boss 132 to feed gaseous high pressure fuel into the high pressure chamber of regulator 116. The axially opposite inlet port that is not used is then sealed by a pipe-threaded plug. Likewise, the outlet line 17 coupling the low pressure gaseous fuel output of pressure regulator 16 to mixer 18 is pipe-thread screwed into whichever is the more convenient of the outlet port bosses 134 and 136. Hitherto the unused outlet boss would likewise again be sealed with a pipe-threaded plug.

However, in accordance with the present invention, whichever of the dual outlet bosses is to be the unused outlet boss, herein shown to be boss 136, is now conveniently used for mounting a solenoid force motor unit 140 in removable sealed relation on housing 118 so that unit 140 also functions as the boss plug. Solenoid force motor 140 is of the rotary actuator type and is mounted in its own casing 141 that is provided at one end with suitable external pipe threads matching the internal pipe threads of outlet boss 136 to thereby enable pipe-threaded sealed mounting of unit 140 thereon. The control energizing leads 31 are sealably fed through the back end of casing 141 of unit 140. (FIG. 3) The internal rotary armature (not shown) of unit 140 is direct coupled to a rigid external actuating member in the form of a metal rod 142 having a first straight portion 144 coaxial with the rotational axis of the armature of solenoid 140 and bi-directionally rotationally driven thereby.

Actuating member 142 also has a mechanical force applying finger 146 integrally cantilever joined at one end to portion 144 and extending perpendicularly to the axis thereof. Finger 146 is suitably dimensioned so as to have its free end tip 148 disposed at zero set condition in the space between diaphragm 124 and an adjacent arm portion 150 of a valve-actuating lever 152 that is pivotally mounted in low pressure chamber 122 of housing 118. Diaphragm 124 has a notched bracket 154 (FIGS. 4 and 5) that slides over this valve-remote arm portion 150 of lever 152 to thereby directly mechanically couple the center of diaphragm 124 in push-pull relation to lever arm portion 150. Lever 152 has pivotal motion about the axis of a pivot pin 156 mounted in wall 120. Lever 152 carries at the free end of a valve-proximate lever arm portion 157 an elastomeric valve member 160 that is held yieldably and sealably closed against a flow-controlling annular valve seat surface 162. Valve 160 thus controls the flow of gaseous fuel from the high pressure chamber via a midwall passage 164 (FIG. 5) into the low pressure chamber 122 of regulator 116.

A compression coil spring 166 is mounted between the valve-remote arm portion 150 of lever 152 and the midwall 120 of housing 118 and serves as the primary source of pressure regulating force by biasing lever 152 for counter-clockwise pivotal motion (as viewed in FIG. 5) about the axis of pin 156. Spring 166 thereby develops the pressure regulating biasing force acting in a closing direction on valve member 160, thereby functioning in a conventional pressure regulating mode of operation. Lever 152 thus operates as a lever of the first class in applying the main pressure regulating biasing force as provided by spring 166.

The engine intake vacuum, exerted in manifold 20 and communicated via mixer 18 and line 17 coupled to outlet boss 134, is utilized as a pressure regulating first modulating parameter to develop a pressure differential and thus actuating force on diaphragm 124, the upper side of which is exposed to ambient atmospheric pressure via the usual atmospheric vent port in the regulator lid (not shown). This diaphragm generated modulating force is transmitted directly to lever 152 via bracket 154 and thence via the rigid lever 152 to valve member 160, to either add to or subtract from the valve closing biasing force developed by spring 166, the latter force also being transmitted by lever 152 to valve member 160 in accordance with conventional pressure regulator practice.

In accordance with one principal feature of the present invention and provided in the first embodiment regulator 116, the output signal from electronic control unit 30 is coupled via line 31 to the rotary solenoid of solenoid force motor unit 140 to develop an output torque that is exerted on actuating member rod 142 to cause it to mechanically modulate the valve biasing force exerted via lever 152 on valve member 160. Thus, when the sensed input parameter signal to unit 140 is intended to modulate the force tending to close valve member 160 by acting against the force exerted by spring 166, the rotational torque exerted via actuating member 142 rotates finger 146 clockwise as viewed in FIGS. 2 and 5 to thereby bring the free end tip 148 of finger 146 into abutting engagement with the valve-remote arm portion 150 of lever 152. In this manner solenoid force motor unit 140, through rigid actuating member 142, is electromechanically operably coupled via rigid lever 152 to valve member 160 independently of spring 166. The force applied by spring 166 to valve member 160 is thereby mechanically modulated in bypass relation to spring 166 so that the control of the operative position of valve member 160, and thus flow of fuel through the housing of regulator 116, is more accurately and reliably a function of the fuel control signal fed to solenoid force motor 140 of the regulator. Hence the sensed parameter signal from ECU 30 is not mechanically dependent upon force transmittal through a "soft" element, i.e., coil spring 166, of the mechanical force application control linkage system.

In addition to the foregoing advantage of the first embodiment regulator 116, it will be seen that the construction and retrofit installation of the solenoid force motor unit 140 is simple, economical and reliable. Unit 140 may be easily retrofit installed simply by removing the plug from boss 136, inserting a free end of actuating member 142 through the opening in the boss and into approximate operative position and then screwing casing 141 tight into boss 136 to thereby provide a strong and sealed cantilever mount of the same to housing 118 of unit 116. This can be done without even removing the diaphragm 124 and associated cover lid from regulator 116. However, if desired such components can be readily removed to render the installation visible to the installer.

SECOND EMBODIMENT PRESSURE REGULATOR

Figure 6:
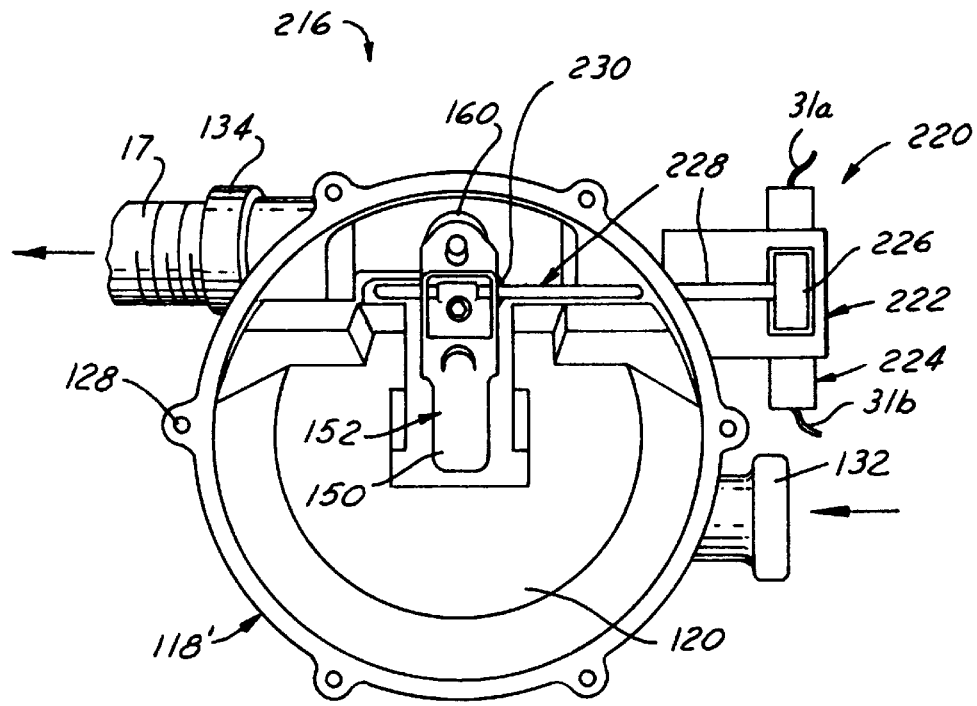
FIG. 6 is a plan view similar to that of FIG. 4 illustrating a second embodiment of the invention providing a built-in rotary-type solenoid actuating coil mounted to the housing, and again having the regulating diaphragm and associated cover lid removed from the housing and thus not shown.

FIG. 6 illustrates a second embodiment pressure regulator 216 also provided in accordance with the present invention. Those elements of regulator 216 are identical to elements of regulator 116 previously described are given identical reference numerals, and those elements alike in function to those previously described in conjunction with regulator 116 are given like reference numerals raised by a prime suffix, and their description not repeated. Housing 118' of regulator 216 has only a single high pressure inlet boss 132 and a single low pressure outlet boss 134, but otherwise is similar to housing 118, and likewise is provided with diaphragm 124 and cover lid therefor (not shown). Regulator 216 is not a retrofit type application of the invention but rather is designed for a construction as initially manufactured to incorporate a solenoid force motor unit 220 that comprises a conventional rotary actuator stator component 222 suitably encased and mounted to the side of housing 118 as shown in FIG. 6. A rotary actuator solenoid winding component 224 encircles stator 222 in a co-planar set-up with a rotary solenoid armature 226 in a conventional manner. Armature 226 rotatably drives and is journalled by a shaft 228 that extends through a suitable aperture in the sidewall of housing 118' into the low pressure chamber on the diaphragm side of wall 120. The solenoid-remote end of shaft 228 is suitable journalled in housing 118' and takes the place of the pivot pin 156 to serve as the pivot journal for the valve actuating lever 152. Shaft 228 is secured by a suitable weld 230 to the side of lever 152 so that lever pivoting imparts rotation to shaft 228, and vice versa. The control signal from ECU 30 is transmitted through leads 31a and 31b to the solenoid coil 224 for controlling rotation of shaft 228 in the manner of actuating member rod 142.

Thus, in the operation of the second embodiment pressure regulator 216 of the invention, primary regulation of pressure is under the control of the valve spring 166 operating beneath the valve-remote arm portion 150 of lever 152 in the manner of the first embodiment regulator 116. Engine manifold vacuum modulates this control by means of the pressure differential acting on regulating diaphragm 124 present in unit 216 and linked by bracket 154 to lever 152 in the manner previously described in conjunction with regulator 116.

The other parameters of engine operation described previously in conjunction with the system of FIG. 1 developed in the ECU 30 are inputted to the system via unit 220 as a direct torque coupling input from shaft 228 to lever 152 at its axis of rotation, thereby functioning as a direct push-pull mechanical torque transmission coupling that also, like the first embodiment, is arranged in bypass relation, mechanically, to spring 166 to thereby further modulate the mechanical forces being exerted via lever 152 on valve member 160.

Pressure regulator 216 thus is advantageous in eliminating the use of spring 166 as a "soft" mechanical component in the mechanical linkage force transmission path between solenoid force motor 220 and lever 152. Unit 216, like unit 116, is also advantageous in introducing the input mechanically from the solenoid force motor units 140 and 220 via a housing entrance into the low pressure side of the pressure regulator to thereby minimize the pressure sealing requirements for the mounting arrangement of the solenoid force motor units to the housing 118, 118'.

THIRD EMBODIMENT PRESSURE REGULATOR

Figure 7:
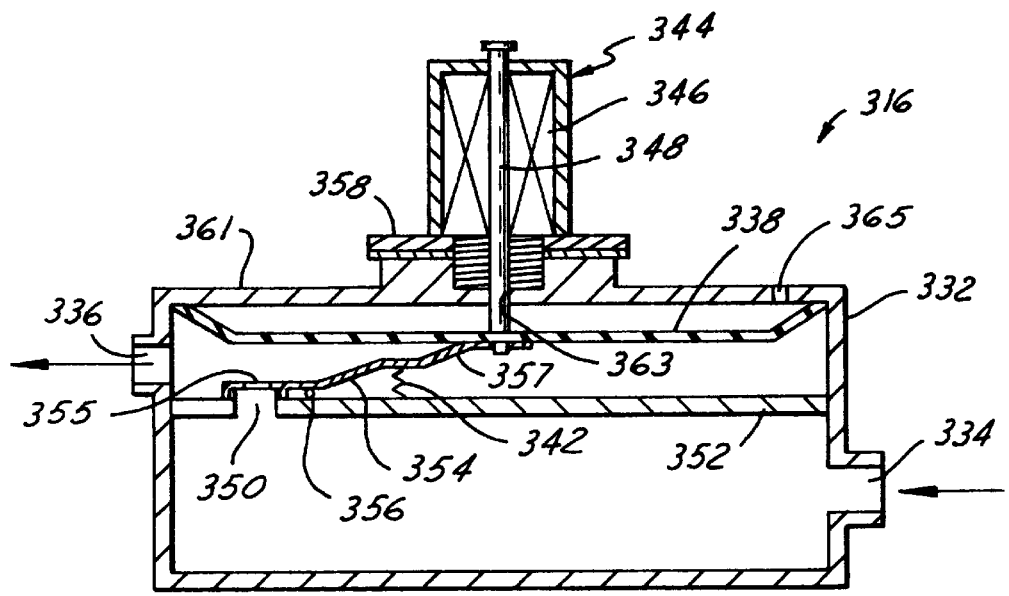
FIG. 7 is a schematic diagram of a third embodiment of the pressure regulator of the invention.

FIG. 7 is a schematic diagram of a third embodiment 316 of a two-stage LP pressure regulator convertor of the invention. The pressure regulator includes a housing 332 having an inlet 334 for connection to fuel supply 14 and an outlet 336 for connection to mixer 18. Within housing 332, a diaphragm 338 spans the housing. A midwall 352 internally spans housing 332, and has a valve-controlled opening or orifice 350 through which fuel flows from inlet 334 to outlet 336. Opening 350 is capped by a regulator lever 354, which is pivoted at 356 to wall 352. Regulator lever 354 carries an integral valve member 355 that opens and closes valve-controlled opening 350 according to the pressure-differential generated positioning of diaphragm 338 acting against the force of a coil spring 342. Coil spring 342 is captured in compression within housing 332 between wall 352 and the valve-remote arm portion 357 of lever 354 for urging lever 354 to pivot counterclockwise (as viewed in FIG. 7) and thus move valve member 355 toward closure of opening 350, and thereby providing primary pressure control to fuel fed through regulator 16. A linear-actuator type solenoid force motor 344 includes a linear force solenoid 346 mounted to an external wall 361 of housing 332, and an armature rod pintle 348 that extends through an opening 363, that may be retrofit provided in housing 332, into opposed engagement with diaphragm 338 at its coupling point to lever 354. Thus, solenoid force motor 344 may selectively oppose to the pressure of spring 342 also acting against diaphragm 338 as a function of fuel control signals from electronic control unit 30 (FIG. 1). Within regulator 316, fuel pressure may be reduced from about 300 psi to approximately twenty inches of water column. The position of diaphragm 338 is dependent upon difference between the pressure of fuel at outlet 336 and atmospheric pressure admitted via atmospheric vent 365, the force applied by coil spring 342, and the force (if any) applied by pintle 348 of solenoid force motor 344. Solenoid force motor 344 is mounted on housing 332 by an adapter plate 358.

An important advantage of the first and third embodiments of the fuel control system in accordance with the present invention is that they may be added by way of retrofit to existing gas-operated engine fuel delivery systems. That is, sensors 22–28 may be operatively coupled to an existing engine 12, and electronic control unit 30 suitably mounted adjacent to the engine. In the third embodiment 316, an existing pressure regulator housing 332 may be modified for external mounting of solenoid force motor 344, and by providing an opening in the housing wall 361 for entry of armature rod 348. Thus, pintle 348 is positioned in facing abutment engagement with the center of diaphragm 338, and may be held thereagainst, if desired, by a small spring within solenoid 346. The solenoid force motor may thus selectively oppose the force of coil spring 342 on diaphragm 338, while acting via rigid lever 354 on valve member 355 in mechanical bypass relation to spring 342, but may not add to the spring force in this embodiment because the pintle is not attached to the diaphragm. In non-retrofit applications, pressure regulator 316 may be constructed in such a way that pintle 348 is push-pull coupled to diaphragm 338 during assembly of the pressure regulator so that linear actuating forces developed in solenoid force motor 344 may selectively add to or subtract from the force applied by coil spring 342 on diaphragm 338.

Solenoid force motor units 140, 220 and 344 may be operated either by a d/c signal, or by a pulse-width modulated signal from ECU 30. Optimum fuel flow is obtained under a wide variety of engine operating condition without extensive and expensive modifications to existing gaseous fuel flow technology.

What is claimed is:

1. A fuel control system for delivering gaseous fuel from a source through an air/fuel mixer to a gas-operated engine, which comprises:
at least one sensor for operative coupling to the engine to provide at least one electronic sensor signal responsive to engine operating conditions,
an electronic control unit responsive to said at least one sensor signal for providing a fuel control signal indicative of a desired quantity of fuel to be delivered to the engine, and
a pressure regulator for disposition between the source and mixer, and responsive to said fuel control signal for controlling delivery of fuel from the source to the mixer,
said pressure regulator comprising a housing having an inlet for connection to the fuel source and an outlet for connection to the mixer, valve means disposed within said housing for controlling flow of fuel from said inlet to said outlet and wherein said valve means includes a valve member and a main pressure regulating spring that biases said valve member to a closed position relative to a housing-interior flow orifice communicating said inlet with said outlet, and a solenoid force motor having a solenoid coil and a rigid actuating member that extends from said coil within said housing and is mechanically operable coupled to said valve member independently of said spring for modulating the force applied by said spring to said valve member and thereby modulating the control of the operative position of said valve member, and therefore flow of fuel through said housing, as a function of said fuel control signal to said pressure regulator.

2. The system set forth in claim 1 wherein said valve means comprises a diaphragm disposed within said housing and lever means coupled to said diaphragm and said valve member and operably biased by said spring for opposing fuel flow through said housing so as to regulate pressure of fuel fed to the mixer.

3. The system set forth in claim 2 wherein said actuating member operably abuttingly engages but is not pull-connected to said lever, such that said actuating member can push against said lever but cannot pull on said lever.

4. The system set forth in claim 3 wherein said solenoid force motor is mounted on an external wall of said housing, with said actuating member extending through said wall of said housing to operatively engage said lever.

5. The system of claim 4 wherein said pressure regulator comprises a housing of the universal ported type with duel inlet bosses and dual outlet bosses with each of the inlet bosses communicating within the high pressure inlet chamber separated by a mid-plane wall of said housing from a low pressure outlet chamber that in turn communicates with both of said outlet bosses, and wherein one of said inlet bosses and one of said outlet bosses is normally plugged in use and the other of said inlet bosses is coupled to said gaseous fuel source and the other of said outlet bosses is coupled via a conduit to said mixer, and wherein said solenoid force motor is enclosed in a casing configured at one end for threading into said other of said outlet bosses in place of the plug normally closing the same to function as both a sealing plug for said other outlet boss and as the mounting structure for said solenoid force motor such that the associated said actuating member extends through said other boss into the interior of said low pressure chamber for operative disposition relative to said valve actuating lever.

6. The system of claim 5 wherein said actuating member comprises a rigid rod having a straight portion co-axially extending with the axis of the armature of said solenoid, said solenoid being a rotary type solenoid and operable for rotating said straight portion of said rod about its axis in response to the energizing signal actuating said solenoid force coil, said actuating member having a finger portion extending perpendicularly from said straight portion and terminating at a free end tip disposed between a valve-remote arm of said lever and said diaphragm for abuttingly engaging said valve-remote lever arm portion of said valve actuating lever in response to rotation of said armature coil rotating said actuating member finger tip into abutment with said lever.

7. The system as set forth in claim 4 wherein said solenoid force motor is of the rotary type and has an armature direct coupled and co-axially aligned with said rigid actuating member, said rigid actuating member having a portion extending into said housing and journalled supported for rotation therein, and wherein said valve actuating lever is mounted for pivotal motion on said actuating member and rigidly coupled thereto for co-rotation therewith in push-pull torque transmission cooperative engagement.

8. The system as set forth in claim 4 wherein said solenoid force motor is mounted on an exterior wall of said housing, said exterior wall being disposed on the side of said diaphragm remote from said valve actuating lever and defining with said diaphragm an atmospheric chamber vented to atmosphere via said wall, said solenoid force motor being mounted on said wall and having a linear actuator solenoid coil and associated linearly actuated piston type pintle and being operative to electromagnetically reciprocate said pintle along a line of action coincident with the normal operative motion of the center of said diaphragm that in turn is operatively mechanically coupled to one end of said valve actuating lever.

9. The system as set forth in claim 8 wherein said solenoid piston pintle has a free end abutting said diaphragm central portion to operatively engage said valve actuating lever in a push-only mode through the mechanical coupling connection of said diaphragm to said valve actuating lever.

10. The system as set forth in claim 9 wherein said solenoid piston pintle is coupled to said diaphragm and hence to said valve actuating lever via push-pull coupling means.

11. The system of claim 2 wherein said lever is pivotally supported within said housing on a fulcrum pivot disposed between said valve member and said spring and said valve member and lever are both disposed on the same side of said diaphragm, and wherein said actuating member operatively engages said lever on the side thereof opposite the side of said lever facing said spring.

12. The system of claim 11 wherein said actuating member engages said lever by acting on the side of said diaphragm opposite to that acted on by said spring and directly opposite a mechanical coupling engagement location between said lever and diaphragm.

13. The system of claim 11 wherein said actuating member directly operatively engages said lever in a zone located between said lever and said diaphragm.

14. The system set forth in claim 1 wherein said solenoid force motor is mounted on external wall of said housing, with said actuating member extending through a wall of said housing to engage said valve means without acting through said main pressure regulating spring.

15. The system set forth in claim 1 wherein said at least one sensor is responsive to at least one engine operating condition selected from the group consisting of engine speed, engine temperature, engine exhaust, air temperature and engine intake manifold air pressure.

* * * * *